(12) United States Patent
Torigata et al.

(10) Patent No.: US 12,122,938 B2
(45) Date of Patent: Oct. 22, 2024

(54) ANTI-RUST COMPOSITION AND RUST PREVENTION METHOD

(71) Applicant: TECH-TAIYO KOGYO CO., LTD., Tokyo (JP)

(72) Inventors: Hiroshi Torigata, Tokyo (JP); Yuki Torigata, Tokyo (JP)

(73) Assignee: TECH-TAIYO KOGYO CO., LTD., Tokyo (JP)

( * ) Notice: Subject to any disclaimer, the term of this patent is extended or adjusted under 35 U.S.C. 154(b) by 0 days.

(21) Appl. No.: 18/293,583

(22) PCT Filed: Oct. 24, 2022

(86) PCT No.: PCT/JP2022/039443
§ 371 (c)(1),
(2) Date: Jan. 30, 2024

(87) PCT Pub. No.: WO2023/132115
PCT Pub. Date: Jul. 13, 2023

(65) Prior Publication Data
US 2024/0263020 A1 Aug. 8, 2024

(30) Foreign Application Priority Data
Jan. 7, 2022 (JP) ................................ 2022-001379

(51) Int. Cl.
*C09D 5/08* (2006.01)
*C09D 7/65* (2018.01)
*C09D 123/20* (2006.01)

(52) U.S. Cl.
CPC ............... *C09D 5/08* (2013.01); *C09D 7/65* (2018.01); *C09D 123/20* (2013.01)

(58) Field of Classification Search
CPC ........... C09D 5/08; C09D 7/65; C09D 123/20
USPC ........................................................ 524/476
See application file for complete search history.

(56) References Cited

U.S. PATENT DOCUMENTS

| 2013/0130056 A1 | 5/2013 | Kimura et al. |
| 2015/0259805 A1* | 9/2015 | Nooren ................... B32B 5/024 252/388 |

FOREIGN PATENT DOCUMENTS

| CN | 103068936 A | 4/2013 |
| CN | 113490769 A | 10/2021 |
| JP | H11222565 A | 8/1999 |
| JP | 2006016632 A | 1/2006 |
| JP | 2013523922 A | 6/2013 |
| JP | 2013163855 A | 8/2013 |
| JP | 2014198864 A | 10/2014 |
| JP | WO2017170868 A1 | 2/2019 |
| WO | 2017170868 A1 | 10/2017 |

OTHER PUBLICATIONS

International Search Report (ISR) mailed Nov. 22, 2022, issued for International application No. PCT/JP2022/039443. (2 pages).
A First Office Action with Search Report issued by the State Intellectual Property Office of China on Jul. 18, 2024, for Chinese counterpart application No. 202280053304.7 (7 pages).

* cited by examiner

*Primary Examiner* — Hannah J Pak
(74) *Attorney, Agent, or Firm* — Law Office of Katsuhiro Arai

(57) ABSTRACT

To provide an anti-rust composition having all of coatability, handleability of a film to be formed, and long-term rust resistance under severe conditions. Furthermore, it is an object to provide an anti-rust composition having all of coatability, handleability of a film to be formed, and long-term rust resistance under severe conditions, and containing a reduced amount of volatile organic solvent used. As a solution, an anti-rust composition containing a polybutene-based polymer, a wax having a melting point of 35° C. or higher, and a polyaniline-based polymer is provided.

6 Claims, No Drawings

ANTI-RUST COMPOSITION AND RUST PREVENTION METHOD

CROSS-REFERENCE TO RELATED APPLICATIONS

This application is the U.S. National Phase under 35 U.S.C. § 371 of International Application PCT/JP2022/039443, filed Oct. 24, 2022, which claims priority to Japanese Patent Application No. JP2022-001379, filed Jan. 7, 2022. The International Application was published under PCT Article 21 (2) in a language other than English.

TECHNICAL FIELD

The present invention relates to an anti-rust composition and a rust prevention method, and furthermore, to a member having a layer constituted by the anti-rust composition.

BACKGROUND ART

Anti-rust treatment with wax-type rust inhibitors in which wax and various additives are dissolved or dispersed in organic solvents is performed on overlapping plate portions of, for example, vehicle bodies and household appliances, vehicle underbodies, parts around tires of vehicles, and parts with pockets at doors and hoods of vehicles.

In particular, because overlapping plate portions (joint portions of steel plates) have a structure in which a plurality of steel plates having a desired shape are brought into contact with each other and joined by, for example, spot welding, a region in which a plating film, a chemical conversion coating, or an electrodeposition coating film, is not sufficiently formed may be generated. For this reason, in overlapping plate portions, bare steel plates may be exposed to a corrosive environment, and it is important to perform sufficient anti-rust treatment with a wax-type rust inhibitor.

As wax-type anti-rust compositions for anti-rust treatment of overlapping plate portions in, for example, vehicle bodies and household appliances, vehicle underbodies, parts around tires of vehicle bodies, and parts with pockets at doors and hoods of vehicle bodies, for example, rust inhibitors, such as Noxudol series, are commercially available and widely used, and moreover various rust inhibitors have been studied so far.

Patent Literature 1 states that an anti-rust coating containing petroleum sulfonate, lanolin fatty acid, hardened castor oil, and a scaly filler and/or a fibrous filler is used for rust resistance of an outer panel of a body or a body component of an automobile.

Patent Literature 2 describes an anti-rust composition containing an anti-rust additive, a wax, a hardened oil, and a diluent, and further containing bentonite in an amount of 2% to 6% by mass based on the total amount of composition.

Patent Literature 3 describes an anti-rust composition prepared by dissolving or dispersing at least one wax selected from thermally polymerized drying oils obtained by thermal polymerization of fats and oils, each having an iodine value of 130 or more, natural waxes, and rigid waxes and/or an anti-rust additive selected from sulfonates, carboxylates, fatty esters, amine salts, oxidized paraffin waxes, and oxidized wax salts, in at least one solvent selected from mineral oil-based lubricant base oils, synthetic lubricant base oils, liquid saturated hydrocarbons, vegetable oil-based semi-drying oils, and mineral oil-based non-drying oils.

Patent Literature 4 describes an anticorrosive composition containing a wax, a doped polyaniline component having a number-average diameter of 100 to 600 nm, and liquid paraffin.

CITATION LIST

Patent Literature

PTL 1: Japanese Unexamined Patent Application Publication No. 11-222565
PTL 2: Japanese Unexamined Patent Application Publication No. 2014-198864
PTL 3: Japanese Unexamined Patent Application Publication No. 2006-16632
PTL 4: Japanese Unexamined Patent Application Publication (Translation of PCT Application) No. 2013-523922

SUMMARY OF INVENTION

Technical Problem

Commercially available anti-rust compositions and the anti-rust compositions described in Patent Literatures 1 to 4 are useful for anti-rust treatment of overlapping plate portions in, for example, vehicle bodies and household appliances, vehicle underbodies, parts around tires of vehicle bodies, and parts with pockets at doors and hoods of vehicle bodies. However, commercially available anti-rust compositions, such as Noxudol and the anti-rust compositions described in Patent Literatures 1 to 3 are not satisfactory in terms of long-term rust resistance and the like under severe conditions. In addition, since the anticorrosive composition described in Patent Literature 4 contains liquid paraffin which is in a liquid state at ordinary temperature, the anticorrosive composition is not satisfactory in terms of, for example, handleability of the formed film.

It is an object of the present invention to provide an anti-rust composition having all of coatability, handleability of a film to be formed, and long-term rust resistance under severe conditions.

It is another object to provide an anti-rust composition having all of coatability, handleability of a film to be formed, and long-term rust resistance under severe conditions, and containing a reduced amount of volatile organic solvent used.

Solution to Problem

The inventors have conducted intensive studies in order to solve the above-mentioned problems and have found that the above-mentioned problems can be solved by the following configuration, thereby accomplishing the present invention.

The specific configuration is given below.

[Item 1]

An anti-rust composition, containing a polybutene-based polymer, a wax having a melting point of 35° C. or higher, and a polyaniline-based polymer.

[Item 2]

The anti-rust composition described in Item 1, further containing one or more types selected from the group consisting of a hydrogenated styrene-based thermoplastic elastomer, an oil having an iodine value of more than 100, an alkyd resin, and a hydrocarbon-based solvent.

[Item 3]

In the anti-rust composition described in Item 1 or 2, the content of polyaniline-based polymer is 2% or more by mass and 17% or less by mass relative to the total amount of anti-rust composition.

[Item 4]

A rust prevention method, including forming, on a metal member, a layer constituted by the anti-rust composition described in any one of Items 1 to 3.

[Item 5]

A member, including a layer constituted by the anti-rust composition described in any one of Items 1 to 3.

Advantageous Effects of Invention

According to the present invention, it is possible to provide an anti-rust composition having all of coatability, handleability of a film to be formed, and long-term rust resistance under severe conditions.

According to the present invention, it is also possible to provide an anti-rust composition having all of coatability, handleability of a film to be formed, and long-term rust resistance under severe conditions, and containing a reduced amount of volatile organic solvent used.

DESCRIPTION OF EMBODIMENTS

An anti-rust composition of the present invention and a member including a layer constituted by the anti-rust composition will be described in detail below. The present invention is not limited to the embodiments exemplified below without departing from the gist thereof.

[Anti-Rust Composition]

The anti-rust composition of the present invention contains a polybutene-based polymer, a wax having a melting point of 35° C. or higher, and a polyaniline-based polymer.

The anti-rust composition of the present invention can further contain one or more types selected from the group consisting of a hydrogenated styrene-based thermoplastic elastomer, an oil having an iodine value of more than 100, an alkyd resin, and a hydrocarbon-based solvent.

Moreover, the content of polyaniline-based polymer in the anti-rust composition of the present invention can be 2% or more by mass and 17% or less by mass relative to the total amount of anti-rust composition.

<Polybutene-Based Polymer>

The polybutene-based polymer is not particularly limited as long as it does not have a chemical-bonding crosslinking moiety. For example, a copolymer having a molecular structure of a long-chain hydrocarbon prepared by reaction of isobutene (isobutylene) as a main component and n-butene (1-butene and 2-butene) as a minor component can be used. This makes it possible to inhibit stickiness of and bleeding from a film constituted by the anti-rust composition, to reduce the hardness of the film constituted by the anti-rust composition, and to improve the fluidity of the anti-rust composition.

As the polybutene-based polymer, a commercially available product can be used as appropriate. For example, it is possible to use one or more selected from the group consisting of grades of product series of "Nisseki Polybutene" available from ENEOS Corporation, "NOF Polybutene Emawet" available from NOF Corporation, "Oppanol" available from BASF, "Beaulon" available from Mitsui Chemicals, Inc., "Indopol" available from Eneos Corporation, and "Idemitsu Polybutene" available from Idemitsu Kosan Co., Ltd.

The number-average molecular weight of the polybutene-based polymer is not particularly limited, and can be, for example, 800 or more, preferably 900 or more, and 3,000 or less, preferably 1,500 or less. The number-average molecular weight can be a catalog value or a value obtained by gel permeation chromatography (GPC) (for example, "HLC-8120GPC" available from Tosoh Corporation is used as GPC, a differential refractometer is used as a detector, "GMHHXL" available from Tosoh Corporation is used as a column, measurement is performed under the following conditions: column temperature: 40° C. and mobile phase: tetrahydrofuran, and the value is calculated in terms of polystyrene).

In view of coating workability and so forth, the polybutene-based polymer can have a pour point of, for example, 25° C. or lower, preferably 20° C. or lower, more preferably 5° C. or lower, and, for example, −10° C. or higher, preferably −8° C. or higher, as measured in accordance with JIS K2269:1987 "Testing Methods for Pour Point and Cloud Point of Crude Oil and Petroleum Products". This can result in appropriate coatability of the anti-rust composition and appropriate handleability of a film to be formed.

In view of coating workability and so forth, the polybutene-based polymer can have a kinematic viscosity at 40° C. of, for example, 5,000 $mm^2/s$ or more, preferably 9,000 $mm^2/s$ or more, and, for example, 35,000 $mm^2/s$ or less, preferably 30,000 $mm^2/s$ or less, as measured in accordance with JIS K2283:2000 "Crude petroleum and petroleum products—Determination of kinematic viscosity and calculation of viscosity index from kinematic viscosity". This can result in appropriate coatability of the anti-rust composition and appropriate handleability of a film to be formed.

The content of polybutene-based polymer relative to the total amount of anti-rust composition is not particularly limited. The content is, for example, 1% or more by mass, preferably 2% or more by mass, more preferably 20% or more by mass, and, for example, 75% or less by mass, preferably 70% or less by mass, relative to the total amount of anti-rust composition (100% by mass of the total amount of anti-rust composition). When the content of polybutene-based polymer relative to the total amount of anti-rust composition is in such a range, it is possible to provide appropriate coatability of the anti-rust composition and appropriate handleability of a film to be formed.

<Wax Having Melting Point of 35° C. or Higher>

The wax having a melting point of 35° C. or higher is not particularly limited. For example, the following can be used: one or more types selected from the group consisting of, for example, microcrystalline waxes, synthetic waxes (such as paraffin-based, polyethylene-based, polypropylene-based, Fischer-Tropsch-based, ethylene-propylene copolymer-based, and petroleum-based), oxidized waxes, animal-based waxes (such as beeswax, lanolin, and spermaceti wax), plant-based waxes (such as candelilla wax, carnauba wax, rice wax, Japan wax, and jojoba oil), and mineral-based waxes (such as montan wax, ozokerite, and ceresin).

As the wax having a melting point of 35° C. or higher, a commercially available product can be appropriately used. For example, the following can be used: one or more types selected from the group consisting of, for example, as synthetic waxes, waxes available from Nippon Seiro Co., Ltd. (e.g., 130° F., 145° F., HNP-3, HNP-9, NPS-9210, NPS-8010, OX-1749, OX-0851, MAW-0300, MAW-0041, MAW-0071, MAW-8061, MAW-9088, and WEISSEN-0373), waxes available from ENEOS Corporation (e.g., 135° F.), and waxes available from Chukyo Yushi Co., Ltd. (e.g., NP-WAX-H-10); as oxidized waxes, waxes obtained by oxidizing various waxes, such as paraffin wax, microcrystalline wax, and petrolatum, obtained in the refining of petroleum fractions, such as waxes available from Nippon Seiro Co., Ltd. (e.g., OX-2251, NPS-8070, ET-0030, and ET-0204); as plant-based waxes, waxes available from S. Kato & Co. (e.g., candelilla wax and carnauba wax); and as animal-based waxes, waxes available from S. Kato & Co. (e.g., beeswax).

In the wax having a melting point of 35° C. or higher in the present invention, the upper limit of the melting point is not particularly limited. For example, the melting point is 150° C. or lower, preferably 120° C. or lower. When the wax has a melting point of 35° C. or higher, the rust resistance of a film and the hardness of a coating film are appropriate. When the wax has a melting point of 150° C. or lower, the precipitation of the wax component can be inhibited. The melting point of the wax in the present invention includes a softening point, a pour point, and a congealing point, in addition to a general melting point. The melting points of the waxes can be catalog values or determined in accordance with JIS K0064:1992 "Test methods for melting point and melting range of chemical products".

In the present invention, two or more types of waxes having different melting points may be mixed and used. For example, a wax having a melting point of 50° C. or lower (low-melting-point wax) and a wax having a melting point of 50° C. or higher (high-melting-point wax) can be mixed and used. The ratio of the content of high-melting-point wax to the content of low-melting-point wax is not particularly limited. The high-melting-point wax/low-melting-point wax can be, for example, 0.3 or more, preferably 0.5 or more, and, for example, 2.7 or less, preferably 1.0 or less.

The acid value of the wax having a melting point of 35° C. or higher is not particularly limited. The acid value can be, for example, 5 mgKOH/g or more, preferably 8 mgKOH/g or more, and, for example, 200 mgKOH/g or less, preferably 100 mgKOH/g or less. The acid value of the wax can be a catalog value or determined in accordance with "7. Potentiometric titration (acid value)" in JIS K2501:2003 "Petroleum products and lubricants—Determination of neutralization number".

The amount of wax having a melting point of 35° C. or higher based on the total amount of anti-rust composition is not particularly limited. The amount is, for example, 7% or more by mass, preferably 9% or more by mass, and, for example, 80% or less by mass, preferably 35% or less by mass, based on the total amount of anti-rust composition (100% by mass of the total amount of anti-rust composition). When the amount of wax having a melting point of 35° C. or higher based on the total amount of anti-rust composition is in such a range, it is possible to provide appropriate coating workability of the anti-rust composition and the rust resistance of a film constituted by the anti-rust composition.

(Polyaniline-Based Polymer)

As the polyaniline-based polymer, a known polyaniline-based polymer can be used without limitation. For example, a commercially available product can be used. A product obtained by polymerizing aniline or an aniline derivative using a known electrooxidative polymerization method or a known chemical oxidative polymerization method can also be used. One or more types of polyaniline-based polymers can be used. In the present invention, a product prepared by a chemical oxidative polymerization method or a commercially available product are preferably used.

The weight-average molecular weight of the polyaniline-based polymer is not particularly limited. However, from the viewpoints of conductivity and handleability, the molecular weight is, for example, in the range of 1,000 to 1,000,000 in terms of polystyrene, as measured by gel permeation chromatography (GPC). Preferably, the molecular weight is in the range of 2,000 to 500,000.

Aniline or an aniline derivative used in the production of the polyaniline-based polymer is not particularly limited as long as it has an aniline skeleton. Examples thereof include aniline or a compound obtained by replacing hydrogen on the benzene ring of aniline with one or more substituents selected from, for example, a halogen, an alkyl group, an aryl group, an alkoxy group, a carboxy group, a cyano group, and a sulfonic acid group. The compound may be a hydrochloride or sulfate. For example, it is possible to use one or more types selected from aniline, o-toluidine, m-toluidine, o-ethylaniline, m-ethylaniline, o-ethoxyaniline, m-butylaniline, m-hexylaniline, m-octylaniline, 2,3-dimethylaniline, 2,5-dimethylaniline, 2,5-dimethoxyaniline, o-cyanoaniline, 2,5-dichloroaniline, 2-bromoaniline, 5-chloro-2-methoxyaniline, 3-phenoxyaniline, aminobenzenesulfonic acid, 2-aminoanisole-sulfonic acid, 3-aminoanisole-sulfonic acid, 4-aminoanisole-sulfonic acid, and hydrochlorides and sulfates thereof. Preferably, one or more types selected from, for example, aniline, aniline hydrochloride, aniline sulfate, aminobenzenesulfonic acid, and alkoxyaniline are used.

Examples of an oxidizing agent (polymerization initiator) used at the production of the polyaniline-based polymer by chemical oxidative polymerization include oxidizing agents, such as ammonium persulfate, potassium persulfate, potassium perchlorate, potassium chloride, potassium iodide, iron (II) chloride, and hydrogen peroxide. Preferable examples thereof include persulfuric acids represented by ammonium persulfate. As the polymerization conditions for the chemical oxidative polymerization, known conditions can be used. For example, the reaction temperature ranges from −40° C. to 80° C., preferably from −5° C. to 30° C.

The polyaniline-based polymer may contain a dopant doped by a known doping means. The dopant is a commonly used acceptor dopant, and a known dopant can be used. Examples thereof include one or more types selected from halogens, such as chlorine, bromine, and iodine; protonic acids, such as hydrochloric acid, sulfuric acid, perchloric acid, tetramethylammonium perchlorate, tetrafluoroboric acid, sodium tetrafluoroborate, hexafluorophosphoric acid, and ammonium hexafluorophosphate, and salts and anions thereof; Lewis acids, such as phosphorus pentafluoride, arsenic pentafluoride, and boron trifluoride; transition metal halides, such as titanium tetrachloride, zirconium tetrachloride, molybdenum pentafluoride, and ferric chloride; carboxylic acids, such as benzoic acid, phthalic acid, and citric acid, and salts and anions thereof; sulfonic acids, such as benzenesulfonic acid, naphthalenesulfonic acid, p-toluenesulfonic acid, ammonium p-toluenesulfonate, trimethylammonium naphthalenesulfonate, and ammonium polystyrenesulfonate, and salts and anions thereof; and phenols, such as p-tert-butylphenol, m-tert-octylphenol, and p-nitrophenol.

As a method for producing the polyaniline-based polymer in the present invention, it is preferable to use a method in which aniline is subjected to chemical oxidative polymerization in the presence of a surfactant, or a method in which aniline is reacted with a surfactant to form an aniline monomer having an amphiphilic structure and then subjected to chemical oxidative polymerization, because a polyaniline-based polymer soluble in various organic solvents and water can be obtained. As the surfactant, a cationic surfactant, such as a long-chain alkyl ammonium salt, an anionic surfactant, such as a long-chain alkyl sulfate, a neutral surfactant, or the like can be used.

A specific example thereof is a method in which aniline hydrochloride or aniline sulfate, a surfactant, such as sodium dodecylsulfate or cetyltrimethylammonium bromide, and if necessary, a solvent, such as water, are mixed together, an oxidizing agent, such as ammonium persulfate, hydrogen peroxide, or ferric chloride, is added thereto to perform chemical oxidative polymerization, and if necessary, a poor solvent is added thereto to precipitate polyaniline, followed by separation and drying.

The content of polyaniline-based polymer relative to the total amount of anti-rust composition is not particularly limited. The content is, for example, 2% or more by mass, preferably 3% or more by mass, and, for example, 17% or less by mass, preferably 15% or less by mass, relative to the total amount of anti-rust composition (100% by mass of the total amount of anti-rust composition). When the content of polyaniline-based polymer relative to the total amount of anti-rust composition is in such a range, it is possible to provide appropriate long-term rust resistance of the anti-rust composition under severe conditions.

<Hydrogenated Styrene-Based Thermoplastic Elastomer>

The anti-rust composition of the present invention may contain a hydrogenated styrene-based thermoplastic elastomer.

The hydrogenated styrene-based thermoplastic elastomer functions as a coating film-forming component. Examples of the hydrogenated styrene-based thermoplastic elastomer include styrene-based elastomers, such as hydrogenated products of styrene-butadiene-styrene block copolymers. As the hydrogenated styrene-based thermoplastic elastomer, a commercially available product can be used. One or more types selected from the group consisting of, for example, Tuftec series (Tuftec P series (SBBS (styrene/butadiene/butylene/styrene block copolymer)), Tuftec H series (SEBS (styrene/ethylene/butylene/styrene block copolymer)), and Tuftec M series (modified product of SEBS)) available from Asahi Kasei Corporation can be used.

The content of hydrogenated styrene-based thermoplastic elastomer relative to the total amount of anti-rust composition is not particularly limited. The content can be, for example, 5% or less by mass, preferably 3% or less by mass, relative to the total amount of anti-rust composition (100% by mass of the total amount of anti-rust composition). When the content of hydrogenated styrene-based thermoplastic elastomer relative to the total amount of anti-rust composition is in such a range, it is possible to provide appropriate coatability of the anti-rust composition, appropriate handleability of a film to be formed, and appropriate long-term rust resistance under severe conditions.

<Oil Having Iodine Value of More than 100>

The anti-rust composition of the present invention may contain an oil having an iodine value of more than 100. Oils each having an iodine value of more than 100 are usually in a liquid state and thus function as solvents in the anti-rust composition. When a film constituted by the anti-rust composition is formed, such an oil is hardened to function as a coating film-forming component.

Among oils each having an iodine value of more than 100, oils each having an iodine value of 130 or more are known as drying oils. Examples thereof include one or more types selected from the group consisting of linseed oil, hemp oil, oiticica oil, safflower oil, perilla oil, tung oil, dehydrated castor oil, and polymers and modified products thereof. Oils each having an iodine value of more than 100 and less than 130 are known as semidrying oils. Examples thereof include one or more types selected from the group consisting of cottonseed oil, soybean oil, rice bran oil, corn oil, sesame oil, rapeseed oil, and polymers and modified products thereof.

In the present invention, the oil having an iodine value of more than 100 is preferably a drying oil having an iodine value of 130 or more. It is preferable to use one or more types selected from the group consisting of, for example, linseed oil, dehydrated castor oil, and tung oil.

The amount of oil having an iodine value of more than 100 based on the total amount of anti-rust composition is not particularly limited. The amount can be, for example, 50% or less by mass, preferably 30% or less by mass, based on the total amount of anti-rust composition (100% by mass of the total amount of anti-rust composition). When the amount of oil having an iodine value of more than 100 based on the total amount of anti-rust composition is in such a range, it is possible to provide appropriate coatability of the anti-rust composition, appropriate handleability of a film to be formed, and appropriate long-term rust resistance under severe conditions.

<Alkyd Resin>

The anti-rust composition of the present invention may contain an alkyd resin. The alkyd resin mainly functions as a coating film-forming component. When a liquid alkyd resin is used as the alkyd resin, the liquid alkyd resin functions as a solvent in the anti-rust composition. When a film constituted by the anti-rust composition is formed, the liquid alkyd resin is hardened to function as a coating film-forming component.

The alkyd resin is prepared by reacting a polybasic acid component, a polyhydric alcohol component, and an oil fatty acid component. Examples of the reaction of these components include esterification and transesterification of the components. The esterification and transesterification of the components can be performed by a known method.

As the polybasic acid component, for example, the following can be used: one or more types selected from the group consisting of, for example, dibasic acids, such as phthalic anhydride, isophthalic acid, terephthalic acid, tetrahydrophthalic anhydride, hexahydrophthalic anhydride, succinic acid, fumaric acid, adipic acid, sebacic acid, and maleic anhydride, and alkyl esters of these acids, the alkyl esters each having 1 to 5 carbon atoms. If necessary, the following can be used: one or more types selected from the group consisting of, for example, monobasic acids, such as benzoic acid, crotonic acid, and p-tert-butylbenzoic acid, and polybasic acids having tri- or higher basicity, such as trimellitic anhydride, methylcyclohexenetricarboxylic acid, and pyromellitic anhydride.

As the polyhydric alcohol component, for example, the following can be used: one or more types selected from the group consisting of, for example, dihydric alcohols, such as ethylene glycol, diethylene glycol, propylene glycol, 1,4-butanediol, neopentyl glycol, 3-methylpentanediol, 1,4-hexanediol, and 1,6-hexanediol. If necessary, the following can be used: one or more types selected from the group consisting of, for example, tri- or higher hydric polyhydric alcohols, such as glycerol, trimethylolethane, trimethylolpropane, and pentaerythritol.

As the oil fatty acid component, for example, the following can be used: one or more types selected from the group consisting of, for example, coconut oil fatty acid, rice bran oil fatty acid, cottonseed oil fatty acid, tall oil fatty acid, castor oil fatty acid, soybean oil fatty acid, palm oil fatty acid, isononanoic acid, rapeseed oil fatty acid, linseed oil fatty acid, safflower oil fatty acid, tung oil fatty acid, dehydrated castor oil fatty acid, lauric acid, myristic acid, palmitic acid, stearic acid, oleic acid, linoleic acid, and linolenic acid.

The oil length of the alkyd resin is not particularly limited, and is preferably, for example, about 50% or less, particularly about 5% to about 20%. In the present invention, it is preferable to use one or more types selected from the group consisting of, for example, tall oil fatty acid, soybean oil fatty acid, linseed oil fatty acid, and dehydrated castor oil fatty acid.

The alkyd resin may be, for example, a phenolic-, acrylic-, or epoxy-modified alkyd resin.

The weight-average molecular weight of the alkyd resin is not particularly limited. For example, the molecular weight can be 300 or more and 100,000 or less.

As the alkyd resin, a commercially available product can be used. Examples thereof include one or more types selected from the group consisting of, for example, Arakyd series available from Arakawa Chemical Industries, Ltd., Alukidir series available from DIC Corporation, and Phthalkyd series available from Showa Denko Materials Co., Ltd.

The content of alkyd resin relative to the total amount of anti-rust composition is not particularly limited. The content can be, for example, 65% or less by mass, preferably 50% or less by mass, relative to the total amount of anti-rust composition (100% by mass of the total amount of anti-rust composition). When the content of alkyd resin contained relative to the total amount of anti-rust composition is in such a range, it is possible to provide appropriate coatability of the anti-rust composition, appropriate handleability of a film to be formed, and appropriate long-term rust resistance under severe conditions.

<Hydrocarbon-Based Solvent>

The anti-rust composition of the present invention may contain a hydrocarbon-based solvent.

The hydrocarbon-based solvent is a solvent composed of a carbon atom and a hydrogen atom and does not contain a heteroatom, such as an oxygen atom, a nitrogen atom, or a sulfur atom. Examples of the hydrocarbon-based solvent include one or more types selected from the group consisting of, for example, aliphatic hydrocarbon-based solvents each having 5 to 20 carbon atoms (e.g., paraffin-based solvents, isoparaffin-based solvents, naphthenic solvents, pentane, hexane, heptane, and octane), aromatic hydrocarbon-based solvents each having 6 to 30 carbon atoms (e.g., alkylbenzene-based solvents each having one or more linear or branched alkyl groups each having 1 to 20 carbon atoms, alkylnaphthalene-based solvents each having one or more linear or branched alkyl groups each having 1 to 20 carbon atoms, and toluene), and alicyclic hydrocarbon-based solvents each having 5 to 20 carbon atoms (e.g., cyclopentane, cyclohexane, and methylcyclohexane).

As the hydrocarbon-based solvent, a commercially available product can be used. Examples thereof include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphthesol 160, Naphthesol 200, and Naphthesol 220 (trade names, all available from ENEOS Corporation); Isopar G, Isopar H, Isopar L, Isopar M, Exxsol D40, Exxsol D60, Exxsol D80, Exxsol D95, Exxsol D110, and Exxsol D130 (trade names, all available from Exxon Mobil Corporation); and Cosmo Allpus 32, Cosmo Allpus 46, Cosmo Allpus 56, Cosmo Allpus 68, Cosmo Allpus 100, Cosmo Allpus 150, Cosmo Allpus 220, Cosmo Allpus 320, and Cosmo Allpus 460 (trade names, all available from Cosmo Oil Lubricants Co., Ltd.). Examples of the aromatic hydrocarbon-based solvent include Grade Alkene L and Grade Alkene 200P (trade names, all available from ENEOS Corporation); and Solvesso 100, Solvesso 150, Solvesso 200, and Solvesso 200ND (trade names, all available from Exxon Mobil Corporation).

The content of hydrocarbon-based solvent contained relative to the total amount of anti-rust composition is not particularly limited. The content can be, for example, 65% or less by mass, preferably 60% or less by mass, more preferably 30% or less by mass, relative to the total amount of anti-rust composition (100% by mass of the total amount of anti-rust composition). When the content of hydrocarbon-based solvent relative to the total amount of anti-rust composition is in such a range, it is possible to provide appropriate coatability of the anti-rust composition, appropriate handleability of a film to be formed, and appropriate long-term rust resistance under severe conditions. When the hydrocarbon-based solvent is not used or is reduced, it is possible to obtain anti-rust composition containing a reduced amount of volatile organic solvent used.

<Additional Components>

The anti-rust composition of the present invention may contain a component (additional component) other than the above-mentioned components. Examples of the additional component include one or more types selected from the group consisting of, for example, coating film-forming components (e.g., polyester resins, polystyrene resins, polyethylene resins, polyamide resins, polyimide resins, poly(vinyl chloride) resins, poly(vinyl acetate) resins, polypropylene resins, epoxy resin, phenolic resins, silicone resins, elastomers, styrene-butadiene copolymers, polybutadienes, fluororesins, polysiloxane resins, acrylic resins, polycarbonate resins, polyacrylonitrile resins, poly(methyl methacrylate) resins, and ABS resins), curing agents, plasticizers, leveling agents, dispersants, colorants (e.g., inorganic pigments and organic pigments), rust inhibitors, bactericides, and fillers (e.g., silica, bentonite, and clay).

The content of additional component is not particularly limited. For example, the content relative to the total amount of anti-rust composition can be 20% or less by mass.

[Member Having Layer Constituted by Anti-Rust Composition]

A member of the present invention is a member including a film constituted by the anti-rust composition.

A method for forming the layer constituted by the anti-rust composition is not particularly limited. Example thereof include (1) a method in which the application or printing of the anti-rust composition heated as needed is performed with, for example, a coating machine (e.g., a spray coating machine, a powder coating machine, a die coater, a curtain coater, an ink jet, or a dip coater), various printers, a brush, a roller, or a blade, or by immersion, (2) a method in which a surface is extrusion coated with the melted anti-rust composition, and (3) a method in which a film constituted by the anti-rust composition is formed and bonded using a known means, such as pressure bonding. Preferably, a method in which the anti-rust composition heated as needed is applied is used.

The member is not particularly limited as long as it is a metal member, in particular, an iron member (e.g., a steel plate, steel wire, a steel rod, or a member formed of one or more of these). Examples thereof include automotive bodies, automotive parts, and housings of household appliances.

In particular, examples thereof include members including overlapping plate portions of, for example, vehicle bodies and household appliances, members, such as vehicle underbodies, parts around tires of vehicles, and members including parts with pockets at doors and hoods of vehicles.

EXAMPLES

While the present invention will be described in more detail below with reference to examples and comparative examples, the present invention is not limited to these examples. Unless otherwise specified, "%" means "% by mass", and "part(s)" means "part(s) by mass".

[Constituent Component]

The constituent components of the anti-rust compositions according to examples and comparative examples are listed below.
- Polybutene A: polybutene (number-average molecular weight: 2,900, kinematic viscosity at 40° C.: 160,000)
- Polybutene B: polybutene (number-average molecular weight: 1,400, kinematic viscosity at 40° C.: 26,000)
- Polybutene C: polybutene (number-average molecular weight: 980, kinematic viscosity at 40° C.: 9,500)
- Wax A: synthetic wax (melting point: 69° C.)
- Wax B: oxidized wax (congealing point: 45° C.)
- PAni-based polymer: polyaniline-based polymer (particles having an primary particle size of about 10 to 50 nm, prepared by adding ammonium persulfate to a mixture of aniline sulfate and sodium dodecylsulfate to perform chemical oxidative polymerization, filtering the resulting reaction liquid, and drying the particles separated by the filtration)
- Solvent 1: naphthenic hydrocarbon-based solvent (aniline point: 68° C.)
- Solvent 2: linear alkylbenzene (molecular weight: 240±5)
- Film-forming material 1: hydrogenated styrene-based thermoplastic elastomer (styrene/ethylene/butylene/styrene block copolymer, density: 0.89 g/cm$^3$, styrene content: 12% by mass)
- Film-forming material 2: oil and oil-modified alkyd resin solution (solid content: 99%, type of oil and fat: tall oil and soybean oil)
- Film-forming material 3: dehydrated castor oil (iodine value: 136 to 145)
- Commercially available anti-rust composition 1: Noxudol 1600 (trade name, manufactured by Auson)
- Commercially available anti-rust composition 2: Noxudol 750 (trade name, manufactured by Auson)
- Commercially available anti-rust composition 3: Noxudol 700 (trade name, manufactured by Auson)

[Evaluation of Anti-Rust Composition]

<Evaluation of Coatability>

The anti-rust composition at 65° C. was applied with a bar coater to a dry thickness of 200 μm. The coatability was evaluated according to the following criteria.
- A: A uniform film can be formed.
- B: Coating cannot be performed at 65° C., but a uniform film can be formed by heating to 100° C.
- C: A film cannot be formed.

<Evaluation of Handleability of Film>

With regard to the formed dried coating film, the handleability of the formed film was evaluated (evaluation of handleability of film) by visual observation and finger touch according to the following criteria.
- A: The coating film is uniform, and no mark is left when the film is touched with a finger.
- B: Wax particles are observed and/or the coating film is soft, but no mark is left when the film is touched with a finger.
- C: A film cannot be formed, and/or a mark is left when the film is touched with a finger.

<Evaluation of Rust Resistance>

A salt spray test (according to JIS Z 2371:2015) was performed using the layer constituted by the anti-rust composition of the obtained test piece as an exposed surface (test surface). The states after 500 hours and 715 hours were visually observed. Evaluation of rust resistance (evaluation of long-term rust resistance under severe conditions) was performed according to the following criteria.
- S: No rust is generated even after 715 hours, and the sound layer constituted by the anti-rust composition is maintained.
- A: No rust is generated after 500 hours, but the generation of rust can be observed in 10% or less of the circumferential length of the layer constituted by the anti-rust composition after 715 hours.
- B: (i) Generation of rust can be observed in 10% or less of the circumferential length of the layer constituted by the anti-rust composition after 500 hours, and the rust after 715 hours is within 10% or less of the circumferential length of the layer constituted by the anti-rust composition, or (ii) No rust is generated even after 715 hours, but a red rust color is observed in the entire layer constituted by the anti-rust composition.
- C: Rust is generated in the entire layer constituted by the anti-rust composition, and rust fluid flows out.

Example 1

First, 1.0 part of polybutene A, 62.5 parts of polybutene B, 11.5 parts of wax A, 19.8 parts of wax B, and 5.2 parts of the PAni-based polymer were placed in a container and mixed together with a stirrer while heated to 65° C., thereby preparing an anti-rust composition.

The resulting anti-rust composition was applied to a cold-rolled steel plate with a bar coater to produce a test piece having a layer, constituted by the anti-rust composition, with a dry thickness of 200 μm.

Table 1 presents the results of the evaluation of coatability, the evaluation of handleability of the film, and the evaluation of rust resistance in Example 1.

Examples 2 to 22 and Comparative Examples 1 to 7

Anti-rust compositions were produced in the same manner as in Example 1, except that polybutenes A to C, waxes A and B, the PAni-based polymer, the solvents 1 and 2, and the film-forming materials 1 to 3 were used in the proportions given in Tables 1 and 2. Test pieces of Examples 2 to 22 and Comparative Examples 1 to 4 were produced in the same manner as in Example 1.

Test pieces of Comparative Examples 5 to 7 were produced in the same manner as in Example 1, except that the commercially available anti-rust compositions 1 to 3 were used.

With regard to Examples 2 to 22 and Comparative Examples 1 to 7, the results of the evaluation of coatability, the evaluation of handleability of the films, and the evaluation of rust resistance are presented in Tables 1 to 3.

TABLE 1

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Polybutene A | 1.0 | 0.4 | 0.4 | 0.4 | 0.4 | 4.3 | 4.3 | 4.3 | 1.0 | 4.3 | 1.0 |
| Polybutene B | 62.5 | 25.7 | 26.3 | 25.7 | 22.8 | 18.1 | 19.8 | 18.9 |  | 18.9 | 60.0 |
| Polybutene C |  |  |  |  |  | 3.0 | 3.0 | 3.0 |  | 3.0 |  |
| Wax A | 11.5 | 4.7 | 4.8 | 4.7 | 5.4 | 5.2 | 5.2 | 5.2 | 11.5 | 5.2 | 11.5 |
| Wax B | 19.8 | 8.1 | 8.3 | 8.1 | 7.9 | 6.5 | 6.5 | 6.5 | 19.8 | 6.5 | 19.8 |
| PAni-based polymer | 5.2 | 2.1 | 2.2 | 2.1 | 3.3 | 3.0 | 1.3 | 2.2 | 5.2 | 2.2 | 5.2 |
| Solvent 1 |  | 59.0 | 52.0 | 53.1 | 53.8 | 53.1 | 53.1 | 26.5 | 54.4 | 29.5 |  |
| Solvent 2 |  |  | 6.0 | 5.9 | 5.6 | 5.9 | 5.9 | 3.0 | 6.0 |  |  |
| Film-forming material 1 |  |  |  |  | 0.8 | 0.9 | 0.9 | 0.9 | 2.1 | 0.9 | 2.1 |
| Film-forming material 2 |  |  |  |  |  |  |  | 26.5 |  | 29.5 |  |
| Film-forming material 3 |  |  |  |  |  |  |  | 3.0 |  |  |  |
| Commercially available anti-rust composition 1 |  |  |  |  |  |  |  |  |  |  |  |
| Commercially available anti-rust composition 2 |  |  |  |  |  |  |  |  |  |  |  |
| Commercially available anti-rust composition 3 |  |  |  |  |  |  |  |  |  |  |  |
| Total | 100.0 | 100.0 | 100.0 | 100.0 | 100.0 | 100.0 | 100.0 | 100.0 | 100.0 | 100.0 | 99.6 |
| Evaluation of coatability | A | A | A | A | A | A | A | A | A | A | A |
| Evaluation of handleability of film | A | A | A | A | A | A | A | B | A | B | A |
| Evaluation of rust resistance | S | S | S | S | S | A | B | B | S | B | S |

TABLE 2

|  | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|
| Polybutene A | 0.8 |  |  |  | 1.0 | 0.8 |  | 0.8 |  |  |  |
| Polybutene B | 19.4 | 27.5 | 21.7 | 19.4 | 27.5 | 22.3 | 21.7 | 19.0 |  | 26.7 | 53.0 |
| Polybutene C | 1.9 | 2.5 | 2.1 | 1.9 | 2.5 | 2.1 | 2.1 | 1.9 | 24.0 |  | 5.0 |
| Wax A | 5.7 | 7.5 | 6.2 | 5.7 | 7.5 | 6.3 | 6.2 | 5.7 | 6.0 | 7.1 | 15.0 |
| Wax B | 7.6 | 11.0 | 9.0 | 8.4 | 10.0 | 8.1 | 9.0 | 7.6 | 8.0 | 2.8 | 22.0 |
| PAni-based polymer | 2.7 | 1.5 | 2.1 | 2.7 | 1.5 | 2.1 | 2.1 | 3.1 | 1.9 | 1.7 | 5.0 |
| Solvent 1 |  |  |  |  |  |  |  |  |  |  |  |
| Solvent 2 |  |  |  |  |  |  |  |  |  |  |  |
| Film-forming material 1 |  |  |  |  |  |  |  |  |  |  |  |
| Film-forming material 2 | 12.3 | 40.0 | 47.1 | 49.5 | 40.0 | 45.9 | 11.8 | 12.3 | 60.1 | 49.5 |  |
| Film-forming material 3 | 49.6 | 10.0 | 11.8 | 12.4 | 10.0 | 12.1 | 47.1 | 49.2 |  | 12.2 |  |
| Commercially available anti-rust composition 1 |  |  |  |  |  |  |  |  |  |  |  |
| Commercially available anti-rust composition 2 |  |  |  |  |  |  |  |  |  |  |  |
| Commercially available anti-rust composition 3 |  |  |  |  |  |  |  |  |  |  |  |
| Total | 100.0 | 100.0 | 100.0 | 100.0 | 100.0 | 99.7 | 100.0 | 99.6 | 100.0 | 100.0 | 100.0 |

TABLE 2-continued

|  | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|
| Evaluation of coatability | A | A | A | A | A | A | A | A | A | A | B |
| Evaluation of handleability of film | A | A | A | A | A | A | A | A | A | A | A |
| Evaluation of rust resistance | S | S | S | S | S | S | S | A | A | B | S |

TABLE 3

|  | Comparative example 1 | Comparative example 2 | Comparative example 3 | Comparative example 4 | Comparative example 5 | Comparative example 6 | Comparative example 7 |
|---|---|---|---|---|---|---|---|
| Polybutene A | 0.6 | 1.1 |  |  |  |  |  |
| Polybutene B | 35.9 | 66.0 | 36.4 | 22.8 |  |  |  |
| Polybutene C |  |  | 3.6 | 2.2 |  |  |  |
| Wax A |  | 12.1 |  | 6.5 |  |  |  |
| Wax B |  | 20.8 |  | 9.5 |  |  |  |
| PAni-based polymer | 3.0 |  |  |  |  |  |  |
| Solvent 1 | 54.3 |  |  |  |  |  |  |
| Solvent 2 | 5.9 |  |  |  |  |  |  |
| Film-forming material 1 | 1.2 |  |  |  |  |  |  |
| Film-forming material 2 |  |  | 11.6 |  |  |  |  |
| Film-forming material 3 |  |  | 46.3 | 59.0 |  |  |  |
| Commercially available anti-rust composition 1 |  |  |  |  | 100.0 |  |  |
| Commercially available anti-rust composition 2 |  |  |  |  |  | 100.0 |  |
| Commercially available anti-rust composition 3 |  |  |  |  |  |  | 100.0 |
| Total | 100.9 | 100.0 | 97.9 | 100.0 | 100.0 | 100.0 | 100.0 |
| Evaluation of coatability | A | A | A | A | A | A | A |
| Evaluation of handleability of film | C | A | A | A | A | A | A |
| Evaluation of rust resistance | — | C | C | C | C | C | C |

According to the present invention, there is provided an anti-rust composition having all of coatability, handleability of a film to be formed, and long-term rust resistance under severe conditions.

According to the present invention, it is also possible to provide an anti-rust composition having all of coatability, handleability of a film to be formed, and long-term rust resistance under severe conditions, and containing a reduced amount of volatile organic solvent used.

The results in the above examples and comparative examples indicate that the anti-rust composition of the present invention is excellent in coatability and rust resistance and can inhibit the generation of rust for a long period of time.

The invention claimed is:

1. An anti-rust composition, comprising a polybutene-based polymer, a wax having a melting point of 35° C. or higher, and a polyaniline-based polymer, and optionally a hydrogenated styrene-based thermoplastic elastomer, an oil having iodine value of more than 100, an alkyd resin, and/or a hydrocarbon-based solvent, and comprising no fillers,
wherein, relative to a total amount of anti-rust composition, which is 100% by mass,
a content of the polybutene-based polymer is 20% or more by mass and 70% or less by mass,
a content of the wax having a melting point of 35° C. or higher is 7% or more by mass and 35% or less by mass,
a content of the polyaniline-based polymer is 3% or more by mass and 15% or less by mass, a content of the hydrogenated styrene-based thermoplastic elastomer is 5% or less by mass,
a content of the oil having iodine value of more than 100 is 30% or less by mass,
a content of the alkyd resin is 50% or less by mass,
a content of the hydrocarbon-based solvent is less than 30% or less by mass, and
a total content of the polybutene-based polymer, the wax having a melting point of 35° C. or higher, the polyaniline-based polymer, the hydrogenated styrene-based thermoplastic elastomer, the oil having iodine value of more than 100, the alkyd resin, and the hydrocarbon-based solvent is 80% or more by mass,
wherein the polybutene-based polymer has a pour point of 25° C. or lower and −10° C. or higher as measured in accordance with JIS K2269:1987, and
the wax having a melting point of 35° C. or higher is constituted by two or more waxes having different melting points, and each wax has an acid value of 5 mgKOH/g or more and 200 mgKOH/g or less.

2. The anti-rust composition according to claim 1, which comprises at least one of the hydrogenated styrene-based thermoplastic elastomer, the oil having an iodine value of more than 100, the alkyd resin, and the hydrocarbon-based solvent.

3. A rust prevention method, comprising forming, on a metal member, a layer constituted by the anti-rust composition according to claim 1.

4. A member, comprising a layer constituted by the anti-rust composition according to claim 1.

5. A rust prevention method, comprising forming, on a metal member, a layer constituted by the anti-rust composition according to claim 2.

6. A member, comprising a layer composed of the anti-rust composition according to claim 2.

* * * * *